(12) United States Patent
Lim et al.

(10) Patent No.: US 9,648,329 B2
(45) Date of Patent: May 9, 2017

(54) METHOD AND APPARATUS FOR PREDICTIVE ENCODING/DECODING OF MOTION VECTOR

(71) Applicant: SK TELECOM CO., LTD., Seoul (KR)

(72) Inventors: Jeongyeon Lim, Seongnam-si (KR); Joong Gunn Park, Suwon Si (KR); Joohee Moon, Seoul (KR); Yunglyul Lee, Seoul (KR); Haekwang Kim, Seoul (KR); Byeungwoo Jeon, Seongnam-si (KR); Jongki Han, Seoul (KR); Sungwon Lim, Seoul (KR); Juock Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/278,019

(22) Filed: Sep. 27, 2016

(65) Prior Publication Data

US 2017/0019671 A1 Jan. 19, 2017

Related U.S. Application Data

(63) Continuation of application No. 14/286,072, filed on May 23, 2014, which is a continuation of application No. PCT/KR2012/009964, filed on Nov. 23, 2012.

(30) Foreign Application Priority Data

Nov. 24, 2011 (KR) .......................... 10-2011-0123841
Nov. 22, 2012 (KR) .......................... 10-2012-0133206

(51) Int. Cl.
*H04N 19/00* (2014.01)
*H04N 19/139* (2014.01)
(Continued)

(52) U.S. Cl.
CPC ......... *H04N 19/139* (2014.11); *H04N 19/105* (2014.11); *H04N 19/176* (2014.11); *H04N 19/52* (2014.11)

(58) Field of Classification Search
CPC ........................... H04N 19/139; H04N 19/513
(Continued)

(56) References Cited

U.S. PATENT DOCUMENTS

| 8,976,865 B2 * | 3/2015 | Park ....................... H04N 19/52 375/240.16 |
| 2005/0259738 A1 * | 11/2005 | Horishi ................. G06T 3/4007 375/240.16 |
| 2012/0134415 A1 | 5/2012 | Lin et al. |

FOREIGN PATENT DOCUMENTS

| KR | 1020050097386 A | 10/2005 |
| KR | 1020080088039 A | 10/2008 |

(Continued)

OTHER PUBLICATIONS

International Search Report mailed Feb. 20, 2013 for PCT/KR2012/009964, citing the above reference(s).

*Primary Examiner* — Jeffery Williams
(74) *Attorney, Agent, or Firm* — Hauptman Ham, LLP

(57) ABSTRACT

A video encoding apparatus includes: a predictor to generate a predicted block of a current block corresponding to a predicted motion vector and a differential motion vector; and an entropy encoder to encode an index for use in identifying the predicted motion vector of the current block and the differential motion vector in a bitstream, where the predicted motion vector of the current block corresponds to a motion vector identified by the index in an inter prediction mode, and where the index corresponds to at least one of representative blocks determined using neighboring blocks of the current block, in consideration of priorities of block positions.

5 Claims, 19 Drawing Sheets

(51) Int. Cl.
*H04N 19/52* (2014.01)
*H04N 19/105* (2014.01)
*H04N 19/176* (2014.01)

(58) Field of Classification Search
USPC .................................................... 375/240.16
See application file for complete search history.

(56) References Cited

FOREIGN PATENT DOCUMENTS

| KR | 1020110020212 A | 3/2011 | |
|----|----|----|----|
| KR | 1020110042705 A | 4/2011 | |
| WO | 2011/062392 A2 | 5/2011 | |
| WO | WO 2011062392 A2 * | 5/2011 | ............. H04N 19/52 |

* cited by examiner

| NumCand : 6 ||
|---|---|
| Order | bin |
| 0 | 0 |
| 1 | 10 |
| 2 | 110 |
| 3 | 1110 |
| 4 | 11110 |
| 5 | 11111 |

| NumCand : 5 ||
|---|---|
| Order | bin |
| 0 | 0 |
| 1 | 10 |
| 2 | 110 |
| 3 | 1110 |
| 4 | 1111 |

| NumCand : 4 ||
|---|---|
| Order | bin |
| 0 | 0 |
| 1 | 10 |
| 2 | 110 |
| 3 | 111 |

| NumCand : 3 ||
|---|---|
| Order | bin |
| 0 | 0 |
| 1 | 10 |
| 2 | 11 |

| NumCand : 2 ||
|---|---|
| Order | bin |
| 0 | 0 |
| 1 | 1 |

FIG. 13

| d Unidirection + AMVP | e Bidirection + Skip | f Unidirection + Merge | g Bidirection + AMVP |
|---|---|---|---|
| c Bidirection + AMVP | Current Block | | |
| b Bidirection + Merge | | | |
| a Bidirection + Skip | | | |

*FIG. 18*

METHOD AND APPARATUS FOR PREDICTIVE ENCODING/DECODING OF MOTION VECTOR

CROSS-REFERENCE TO RELATED APPLICATIONS

The instant application is a continuation of U.S. patent application Ser. No. 14/286,072 filed May 23, 2014, which a continuation of PCT/KR2012/009964, filed Nov. 23, 2012, which is based on and claims priorities to Korean Patent Application No. 10-2011-0123841, filed on Nov. 24, 2011 and Korean Patent Application No. 10-2012-0133206, filed on Nov. 22, 2012. The disclosures of above-listed applications are hereby incorporated by reference herein in their entirety.

TECHNICAL FIELD

The present disclosure in some embodiments relates to a method and an apparatus for predictively encoding and decoding a motion vector.

BACKGROUND

The statements in this section merely provide background information on embodiments of the present disclosure and do not constitute prior art.

A video image is formed of a series of pictures, and each picture is divided into predetermined regions such as blocks. When the region of an image is divided into blocks, the divided blocks are classified into an intra block and an inter block depending on an encoding scheme. The intra-block refers to a block that is encoded based on an intra-prediction coding scheme. The intra-prediction coding scheme predicts pixels of a current block by using pixels of neighboring blocks that have been already encoded and decoded within a current picture, so as to generate a predicted block, and encodes pixel differences between the predicted block and the current block. The inter-block means a block that is encoded based on an inter-prediction coding scheme. The inter-prediction encoding scheme predicts a current block in a current picture by referring to at least one previous picture and/or at least one subsequent picture, so as to generate a predicted block, and encodes the difference between the predicted block and the current block. Here, a picture that is referred to in encoding or decoding the current picture (i.e., current frame) is called a reference picture.

The inventor(s) has noted that the general purpose of image signal coding is to reduce data volume of the image, that is, to perform an image compression. The inventor(s) has noted that the image compression takes the prediction in two ways, that is, an intra prediction and an inter prediction. The prediction serves to generate predicted image signals similar to original signals and transmit differences between the original signals and the predicted signals. Assuming pixel values are presented with 100, 200, 150, 240 and 178, their binary numbers are expressed as 100=1100100(2), 200=11001000(2), 150=10010110(2), 240=11110000(2) and 178=10110010(2), 40 bits in total. However, when these values are predicted into, e.g. 95, 190, 149, 240 and 178 and encoding is performed on residual signals that are the differences between the predicted values and the original values, the encoded result is expressed by 5=101(2), 10=1010(2), 1=1(2) and 0=0(2) which mean substantially reduced bits used in encoding and in turn reduced size of the overall image to be transmitted to a decoding apparatus. In other words, the inventor(s) has noted that the better prediction achieves the higher coding efficiency.

SUMMARY

In accordance with some embodiments of the present disclosure, a video encoding apparatus comprises a predictor and an entrophy encoder. The predictor is configured to generate a predicted block of a current block corresponding to a predicted motion vector and a differential motion vector. And the entrophy encoder is configured to encode an index for use in identifying the predicted motion vector of the current block and the differential motion vector in a bitstream. Herein, the predicted motion vector of the current block corresponds to a motion vector identified by the index in an inter prediction mode. Herein, the index corresponds to at least one of representative blocks determined using neighboring blocks of the current block, in consideration of priorities of block positions.

BRIEF DESCRIPTION OF DRAWINGS

FIG. 13 is an exemplary diagram of truncated codes that encode indexes used in AMVP, merge and skip.

FIG. 18 is an exemplary diagram of inter prediction modes and prediction directions of neighboring blocks of a current block.

DETAILED DESCRIPTION

Figure 1:
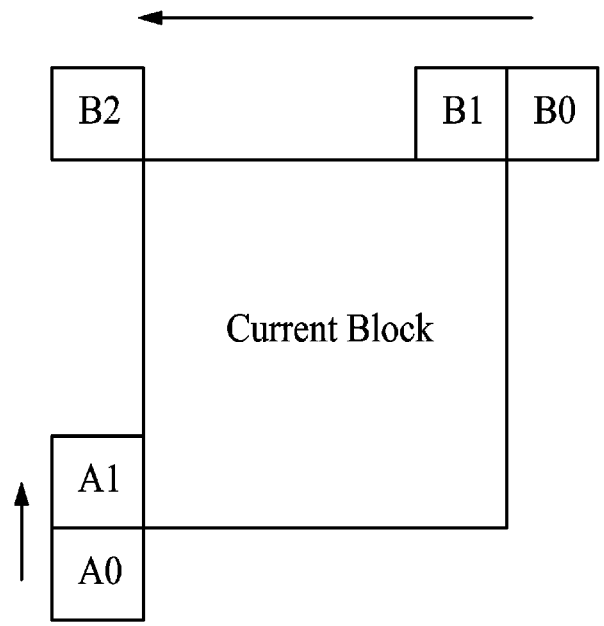
FIG. 1 is an exemplary diagram of neighboring blocks A0, A1, B0, B1 and B2 of a current block used in motion vector prediction according to at least one embodiment of the present disclosure.

Described hereinafter is a technology for setting neighboring candidate blocks for motion vector prediction according to characteristics of an image, and for finding the most similar predicted motion vector to the motion vector of a current block more accurately. Exemplary embodiments of the present disclosure will be described with reference to the accompanying drawings and expressions. An apparatus for encoding/decoding images in block unit will be described below.

The prediction is classified into an intra prediction and an inter prediction.

In the intra prediction, a predicted block (predicted signals) is generated by using pixels neighboring to the current block and then residual data (residual signals) that are the difference between the current block and the predicted block is transmitted to the decoding apparatus. In this case, it is sufficient to transmit the residual data and a prediction mode index indicating which direction the prediction was made. For example, the prediction mode is 0 when making a prediction by using an upper block, and 1 when making a prediction by using a left block.

In the inter prediction, there are three modes for encoding a current block, which are, motion estimation mode, merge mode, and skip mode.

First, the motion estimation mode is to search for, within a search range in a reference picture, a predicted block having the smallest difference to the current block and then transmit residual signals that are differences between the current block and the predicted block. In this case, a motion parameter indicating a position of the predicted block is transmitted together with the residual signals. The motion parameter includes a motion vector indicating a position of the predicted block, a reference picture index indicating the reference picture where the motion vector was found (for example, indicating that the motion vector was found in the immediately preceding picture or the second preceding picture), and a prediction direction flag indicating whether a prediction was made from the reference picture, in a past or backward direction and/or in a future or forward direction (for example, L0: a prediction from the past picture, L1: a prediction from the future picture). Here, while the reference picture index and the prediction direction flag can be encoded by using a small number of bits, the motion vector of a large value needs a large number of bits to transmit. Then, the motion vector is predicted to determine a predicted motion vector of the current motion vector and its difference from the current motion vector is obtained as a differential motion vector to transmit. Here, such motion vector prediction scheme using both of the predicted motion vector and the differential motion vector is referred to as AMVP (advanced motion vector prediction).

Second, there is a merge mode. The merge mode is to directly utilize motion parameters of a neighboring block of a current block for encoding the current block, wherein the motion parameters are used to generate a predicted block and the difference thereof from the current block is transmitted as residual signals to the decoding apparatus. In the merge mode, differently from the AMVP mode, the predicted block is generated not by performing motion estimation directly but by directly using the motion parameters of the neighboring block. The merge method has advantages of reducing complexity resulting from the motion estimation and transmitting no motion parameters but an index indicating which neighboring block's motion parameters are used. Transmitting just the index instead of the motion parameter means a significant reduction of data amount to transmit and in turn an increased coding efficiency.

Third, there is skip mode. Similar to merge, in the skip mode, the predicted block is generated by using motion parameters of a neighboring block of the current block and an index is transmitted for indicating which block's motion parameters are used. However, unlike merge, the skip method does not encode the residual signals of the current block.

Hereinafter, the AMVP will be described in more detail. In AMVP, a predicted motion vector MVP of the current block is obtained by using motion vectors of neighboring blocks of the current block, and encoding is performed on an index for indicating which neighboring block's motion vector is used as the MVP. The video encoding apparatus calculates and encodes and transmits the differential motion vector corresponding to the difference between the predicted motion vector and the current motion vector, to the video decoding apparatus.

FIG. 1 is an exemplary diagram of neighboring blocks A0, A1, B0, B1 and B2 of a current block used in motion vector prediction according to at least one embodiment of the present disclosure.

Referring to FIG. 1, neighboring blocks used in AMVP are called candidate blocks. Assuming group A is candidate blocks A0 and A1 located at left side of a current block and group B is candidate blocks B0, B1 and B2 located at upper side of the current block, one of motion vectors of the candidate blocks belonging to the group A and one of motion vectors of the candidate blocks belonging to the group B are respectively selected to be representative motion vectors of each group. Further, a temporal motion vector is determined as one of representative motion vectors. An example of a temporal motion vector is a motion vector of a co-located block. The co-located block refers to a block in a position or location in a reference frame, for example in a previous frame, corresponding to that of the current block in the current frame.

Figure 2:
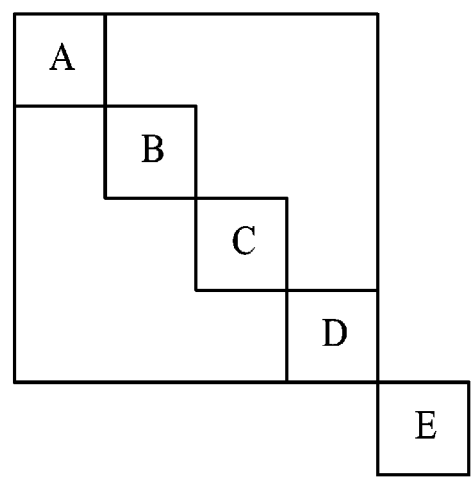
FIG. 2 is an exemplary diagram of similarly located blocks (A-E) which are available for the temporal motion vector.

FIG. 2 is an exemplary diagram of similarly located blocks (A-E) which are available for the temporal motion vector.

Referring to FIG. 2, in all the cases of skip, merge and AMVP, a block that is one of blocks A to D in a reference frame of a current block is determined as a co-located block and used as a temporal candidate block. Another example of the temporal candidate block is a block E, located at the right lower side of the corresponding location of the current block in the reference frame, and any one of neighboring blocks besides block E is determined as the temporal candidate block.

Preliminary encoding is performed on differential motion vectors between the current motion vector and each of the plurality of representative motion vectors and on indexes indicative of the selected blocks' motion vectors, and then the representative motion vector having the highest encoding efficiency is determined as the predicted motion vector of the current motion vector.

Figure 3:
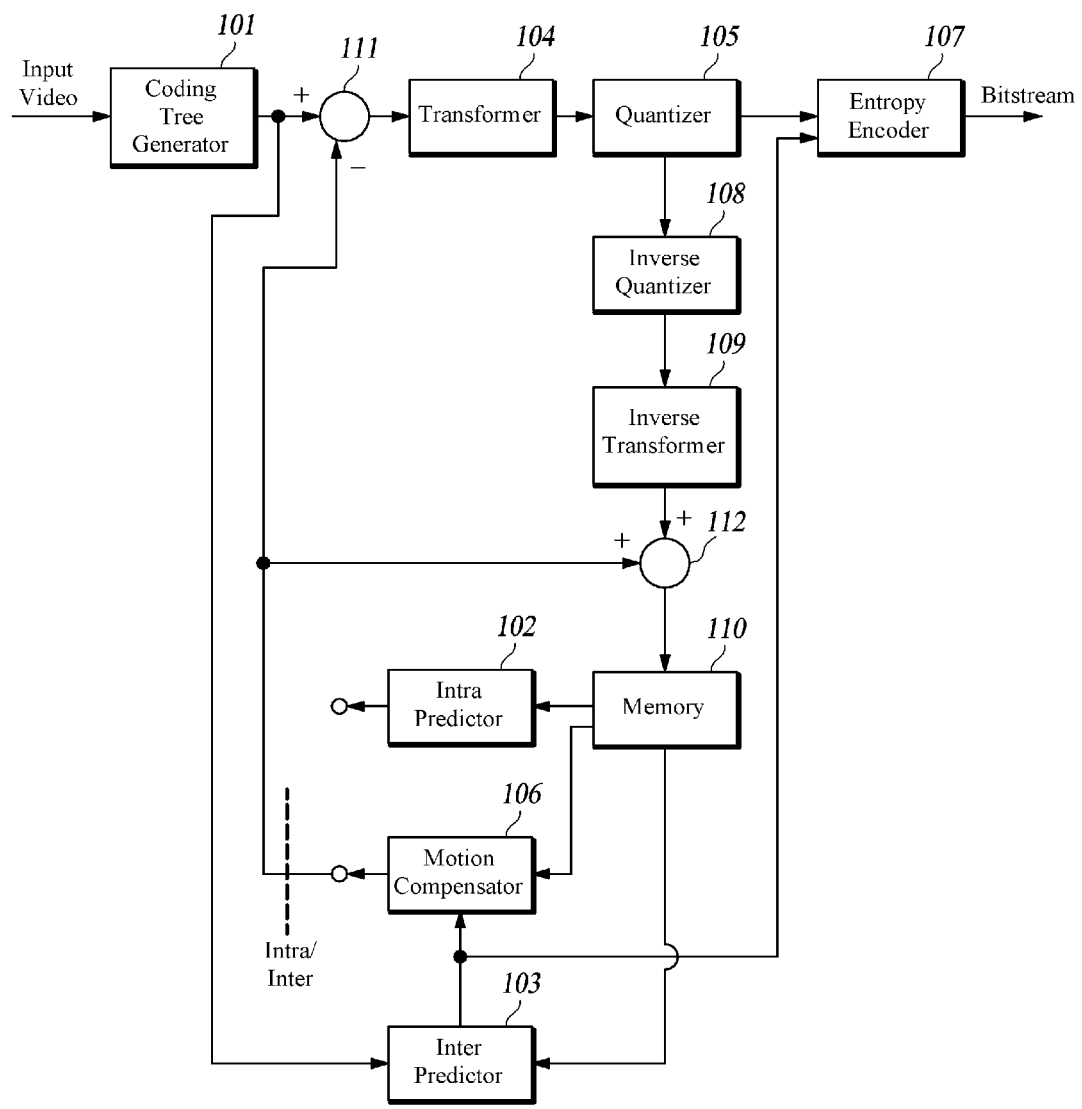
FIG. 3 is a schematic block diagram of a video encoding apparatus according to at least one embodiment of the present disclosure.

FIG. 3 is a schematic block diagram of a video encoding apparatus 100 according to at least one embodiment of the present disclosure. Hereinafter, a brief description will be given of the respective components of the video encoding apparatus 100 according to at least one exemplary embodiment of the present disclosure.

A video encoding apparatus 100 is adapted to encode video images. The video encoding apparatus 100 includes a block partitioning unit or coding tree generator 101, an intra predictor 102, an inter predictor 103, a transformer 140, a quantizer 105, a motion compensator 106, an entropy encoder 107, an inverse quantizer 108, an inverse transformer 109, a memory 110, a subtractor 111 and an adder 112. The video encoding apparatus 100 is a PC (Personal Computer), a TV set, a notebook computer, a PDA (Personal Digital Assistant), a PMP (Portable Multimedia Player), a PSP (PlayStation Portable), a wireless terminal, a digital TV, and the like. The video encoding apparatus 100 corresponds to various apparatuses each including (a) a communication apparatus such as a communication modem and the like for performing communication with various types of devices or wired/wireless communication networks, (b) a memory for storing various programs and data for encoding a video, and (c) a microprocessor to execute the programs so as to perform calculations and controlling, and the likes. That is, all or some components of the video encoding apparatus 100, such as the block partitioning unit or coding tree generator 101, the intra predictor 102, the inter predictor 103, the transformer 140, the quantizer 105, the motion compensator 106, the entropy encoder 107, the inverse quantizer 108, the inverse transformer 109, the memory 110, the subtractor 111 and the adder 112 are implemented by one or more processors and/or application-specific integrated circuits (ASICs).

Figure 4:
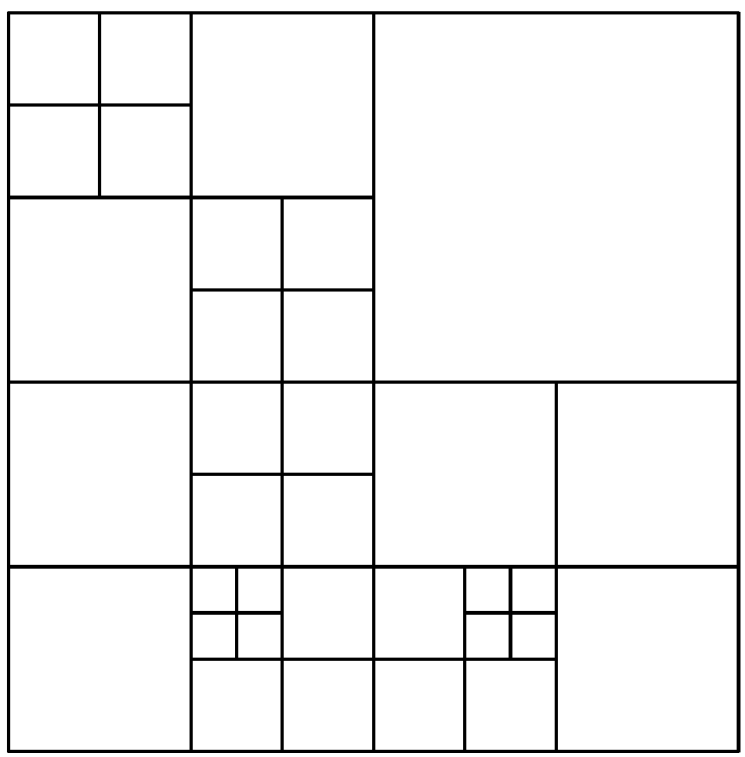
FIG. 4 is an exemplary diagram of a block partitioning from a largest coding unit (LCU).

The block partitioning unit 101 partitions an input image into blocks called coding units or coding blocks. The coding units are basic units partitioned for intra prediction/inter prediction, and have a quad-tree structure in which respective blocks is repeatedly or recursively partitioned into 4 blocks having the same size (for example, in square shapes). For example, a largest coding unit is predetermined in size as 64×64 and a minimum coding unit is predetermined in size as 8×8. FIG. 4 is an exemplary diagram of a block partitioning from the respective largest coding units. While a three-level quad-tree from the largest coding unit to the minimum coding unit is used, higher levels or depths is used. Maximum partition depths for color components, such as luma and chroma are same each other.

Figure 5:
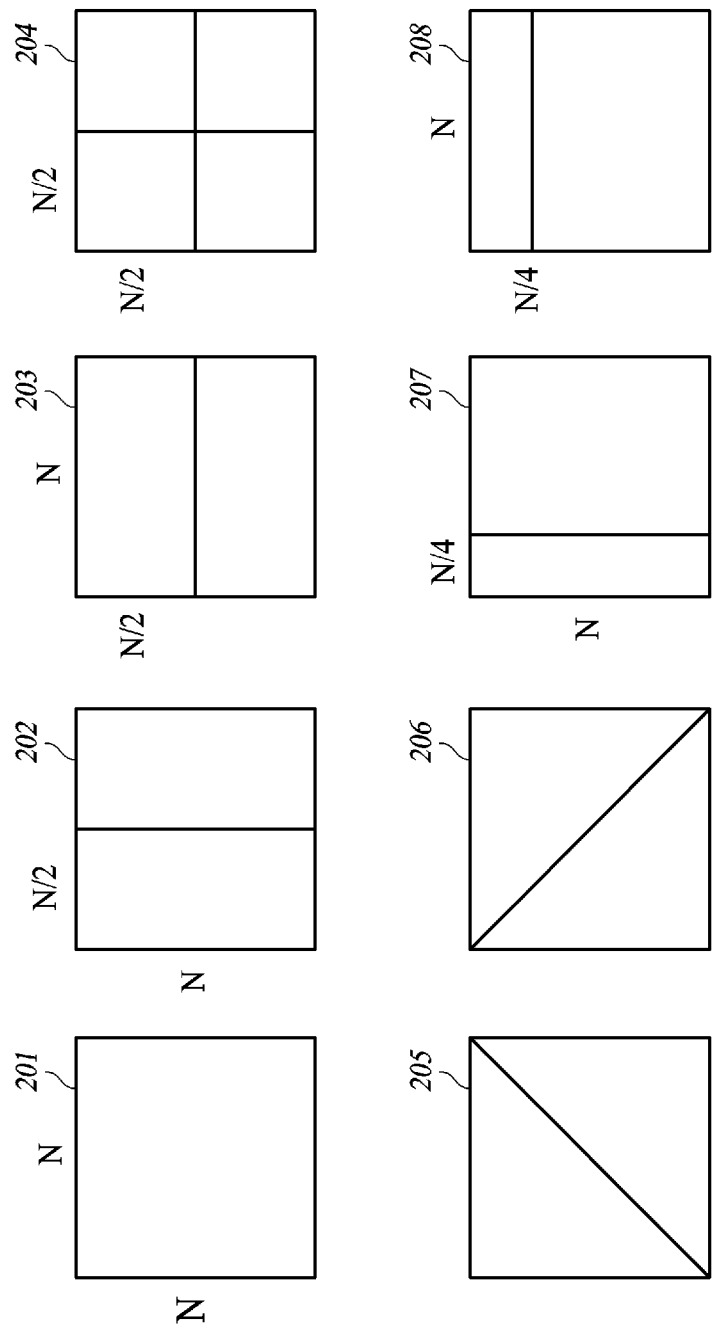
FIG. 5 is an exemplary diagram of a prediction unit.

Each coding unit includes one or more prediction units according to the type of prediction as illustrated in FIG. 5. The prediction unit is the minimum unit having prediction information to generate the aforementioned predicted block. As shown in FIG. 5, 201 indicates a case that the coding unit is used as the prediction unit as it is. 202, 203, 205 and 206 indicate cases that the coding unit is partitioned into 2 prediction units in the same size. 204 indicates a case that the coding unit is partitioned into 4 prediction units in the same size. 207 and 208 indicate cases that the coding unit is partitioned into 2 prediction unit having 1:3 ratio in size. The coding unit is partitioned in a variety of shapes other than illustrations in FIG. 5.

Figure 6:
FIG. 6 is a diagram of a process of generating a predicted block by using pixel values above a current block.
Figure 7:
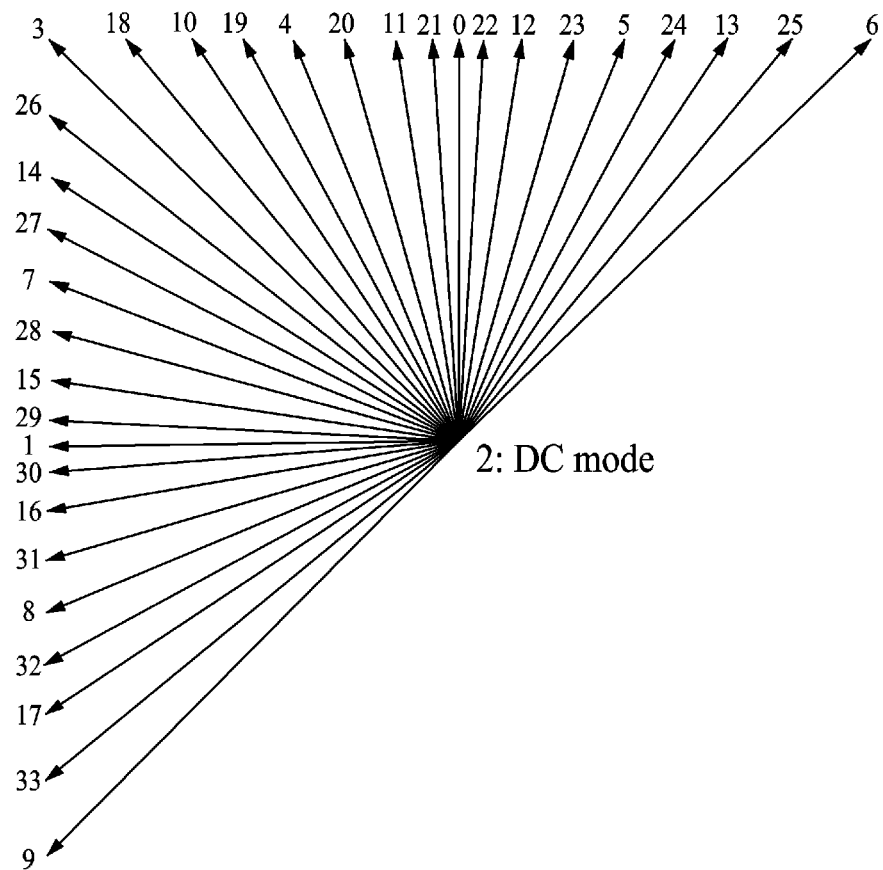
FIG. 7 is a diagram of types of intra prediction modes and their indexes.

The intra predictor 102 generates a predicted block of a current block by using pixel values in a current picture or current frame. While the prediction is made by using information in the current picture, the intra predictor 102 generates the predicted block, as illustrated in FIG. 6, by using pixel values adjacent to the current block, and then the subtractor 111 generates a residual block by subtracting the predicted block from the current block. While the predicted block is generated by using values of upper pixels adjacent to the current block in FIG. 6, the predicted block is generated by using other neighboring pixel values adjacent to the current block rather than the upper pixel values. The neighboring pixels are determined according to intra modes having various angles, as illustrated in FIG. 7. Each numeral denoted in FIG. 7 illustrates an index of the intra prediction mode. After the predicted block is generated, an index indicating the prediction mode used is encoded.

Meanwhile, in case of the intra prediction, the predicted block is generated after smoothing the neighboring pixels by using a smoothing filter. For example, in case that [1, 2, 1] filter is used, pixels used in the intra prediction are modified as described in equation 1.

$$Y[n]=(X[n-1]+2*X[n]+X[n+1]+2)/4 \qquad \text{[Equation 1]}$$

In Equation 1, X[n] denotes value of a pixel to be filtered, and X[n−1] and X[n+1] denote values of left and right neighboring pixels of the pixel to be filtered, in a direction parallel to a borderline of the current block.

Further, it is determined whether the smoothing is to be used depending on the size of the prediction unit and angle of the prediction mode used in the intra prediction. In this case, a lookup table is used in order to determine such smoothing.

Figure 8:
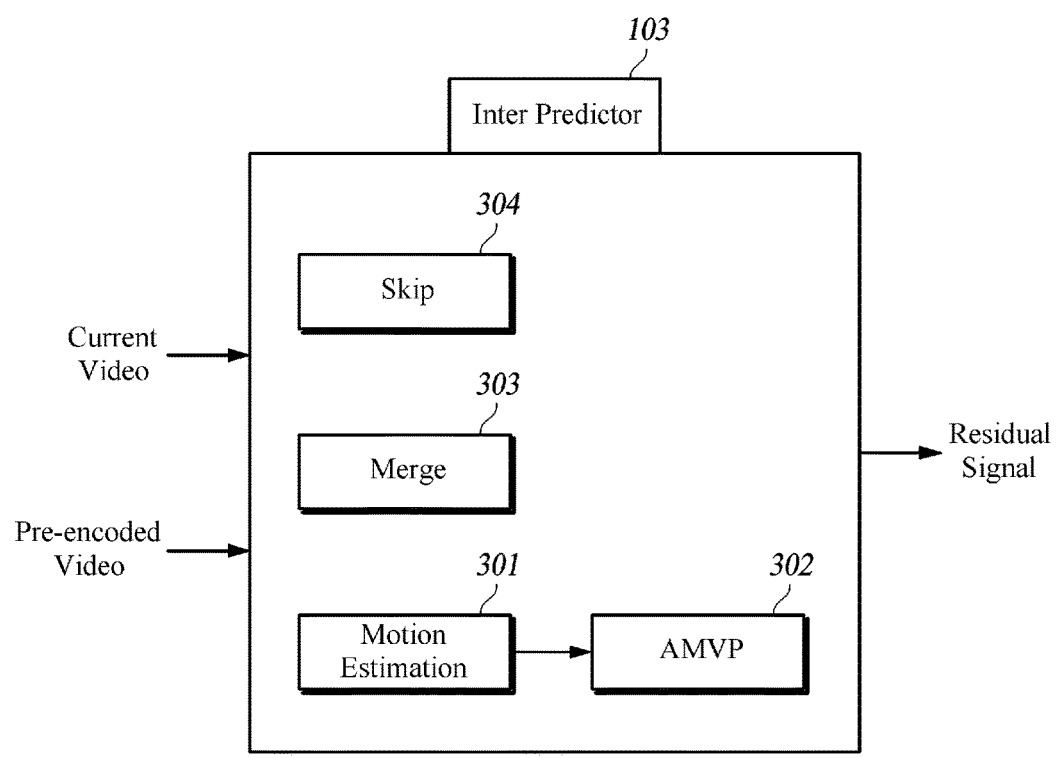
FIG. 8 is an exemplary diagram of an inter predictor that performs a variety of inter predictions.

FIG. 8 is an exemplary diagram of an inter predictor 103 that performs an inter prediction in a variety of ways.

The inter predictor 103 generates a predicted block of the current block by using information on one or more reference pictures that were encoded and decoded prior to encoding a current picture. As illustrated in FIG. 8, the prediction is performed according to three methods of SKIP, merge and motion estimation.

Figure 9:
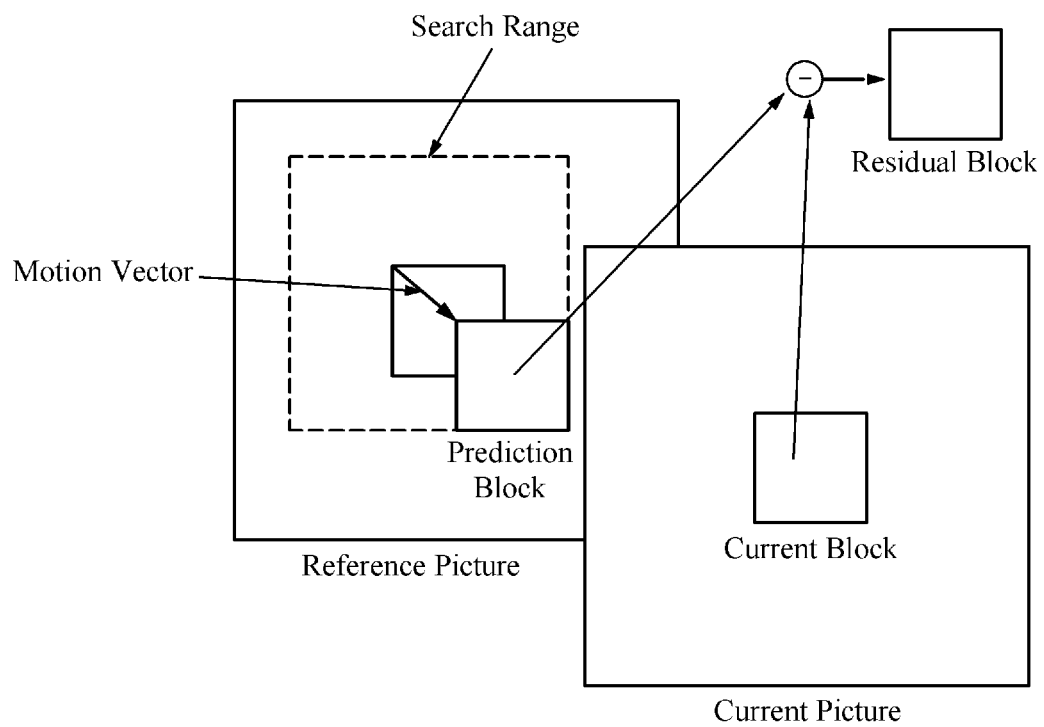
FIG. 9 is an exemplary diagram of a motion estimation method for determining a block, from a reference picture, most similar to a current block as a predicted block of the current block.

FIG. 9 is an exemplary diagram of a case that the most similar block of the current block in a reference picture is determined as a predicted block of the current block by estimating motion.

The motion estimation 301 means to make a prediction by using the reference pictures. Referring to FIG. 9, the most similar block to the current block in the reference picture is determined as a predicted block by using the motion estimation, and the position of the predicted block is expressed as a motion vector. Further, the entropy encoder 107 encodes a relevant motion parameter. Here, the motion parameter includes a motion vector MV, a reference picture index, and a prediction direction. When the motion vector is encoded as it is, its efficiency is reduced. Therefore, a predicted motion vector is generated and then a differential motion vector that is the difference between the original motion vector and the predicted motion vector is encoded. A video decoding apparatus to be described below reconstructs the predicted block by using the motion parameter extracted from the bitstream transmitted by the video encoding apparatus and then decodes the current block by summing the reconstructed predicted block and a corresponding residual block extracted from the bitstream.

AMVP 302 is a method in which a motion vector of a current block is predicted by using motion vectors of neighboring blocks, and an index indicating the block whose motion vector is used to make the motion vector prediction is encoded. Equation 2 is an exemplary expression for calculating a motion vector difference MVD.

$$MVD=MV-MVP \qquad \text{[Equation 2]}$$

Here, MV denotes a motion vector of a current block, MVP denotes a predicted motion vector predicted from one of the predetermined neighboring blocks, and MVD denotes a motion vector difference that is difference between motion vector of the current block and the predicted motion vector.

Figure 10:
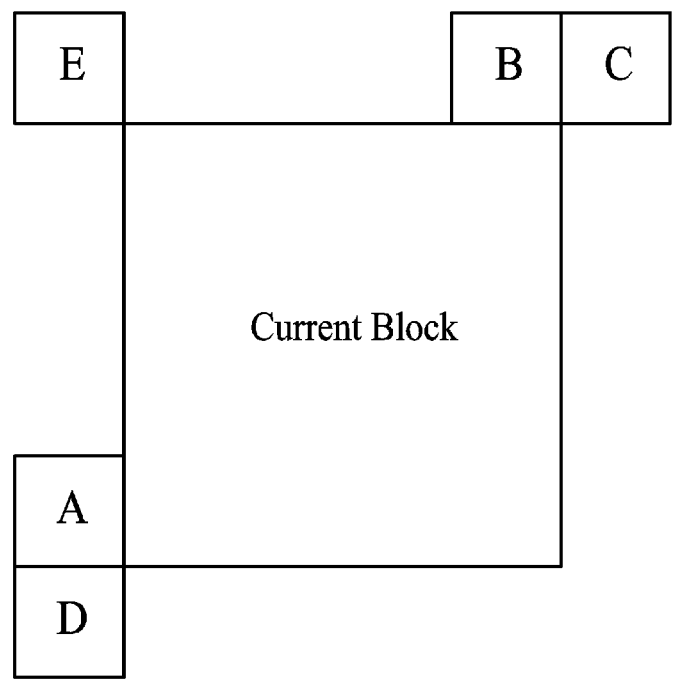
FIG. 10 is an exemplary diagram of neighboring blocks that are used in an inter prediction using a merge method.

FIG. 10 is an exemplary diagram of neighboring blocks that are used for an inter prediction in merge mode.

The merge 303 is a technology to determine a motion parameter for a current block from neighboring blocks of the current block. Referring to FIG. 10, an optimized block for the merge is found in blocks A to E and one of temporal candidate blocks in FIG. 2, or the optimized block is determined from two candidate blocks (that is, representative blocks) having higher priorities among blocks A to E in FIG. 10 and one of the temporal candidate blocks in FIG. 2. For reference, throughout all embodiments, the temporal candidate block means a block in a temporally neighboring picture. For example, it is a block that has the same spatial position as the current block within a immediately preceding picture. The meaning of the temporal candidate block in the AMVP is the same as that of the merge.

The skip 304 means a case that residual signals of the residual block are all 0 when the most similar block (predicted block) to the current block is found out by using the motion parameters of the neighboring blocks. In this case, the residual signals are not encoded. Further, in order to indicate the neighboring block whose motion parameter information was used, an index of the relevant block is encoded.

Candidates of the neighboring blocks of the current block for the AMVP, merge and skip are neighboring blocks other than the neighboring blocks A0 to B2 illustrated in FIG. 1 and the neighboring blocks A to E illustrated in FIG. 10.

The subtractor 111 generates a residual block of the current coding unit based on subtracting each current block partitioned from the current coding unit and the corresponding predicted block.

The frequency transformer 104 (hereinafter "transformer") transforms the residual block in a spatial domain to generate one or more transform blocks. The transform units are basic units used in transforming and quantizing process. The transform units are set from partitioning in the same manner as the coding units as illustrated in FIG. 4 or in other various manners, so as to be transformed. Information on the transform units also have a quadtree structure like the coding units, and the transform units have various sizes. The transformer 104 transforms the residual signals of the respective transform units into a frequency domain to generate and output the corresponding transform blocks having transform coefficients. Here, the residual signals are transformed into the frequency domain by using a variety of schemes, such as a discrete cosine transform (DCT), a discrete sine transform (DST) and a Karhunen Loeve transform (KLT). Using the schemes, the residual signals are transformed into transform coefficients in the frequency domain. A matrix calculation based on a basis vector is used in order to perform the transform in a convenient manner. In the matrix calculation, various transform schemes are used together, depending on prediction schemes. For example, in the intra prediction, the discrete cosine transform is used in the horizontal direction and the discrete sine transform is used in the vertical direction, depending on the intra prediction modes.

The quantizer 105 quantizes the transform blocks and generates quantized transform blocks. That is, the quantizer 105 quantizes transform coefficients of the respective transform blocks output from the transformer 104, and generates the quantized transform blocks having quantized transform coefficients. Here, while the quantizing method is a dead zone uniform threshold quantization (DZUTQ) or a quantization weighted matrix (QWM), a variety of quantizing methods including their improved quantization methods are used.

The inverse quantizer 108 inversely quantizes the quantized transform blocks by inversely performing the quantization scheme that was used in the quantization, thereby reconstructing the transform blocks having the transform coefficients.

The inverse transformer 109 inversely transforms the reconstructed transform blocks so as to reconstruct the residual block having the residual signals, the inverse transform being made by inversely performing the transform scheme used in the transformer 104.

The adder 112 sums the residual block reconstructed in the inverse transformer 109 and the predicted block generated by the intra prediction or inter prediction so as to reconstruct the current block.

The memory 110 stores the reconstructed current block, which is used to predict other blocks in the current picture or blocks in the next picture.

The motion compensator 106 performs a motion compensation after increasing the resolution of a reference picture by interpolating between the pixel values of the reference picture.

Figure 11:
FIG. 11 is a diagram of pixels of a reference picture stored in a memory and pixels interpolating from integer pixels.
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:
Figure 11:

FIG. 11 illustrates pixels of the reference picture and interpolated fractional pixels between pixels (integer pixels) of the reference picture. The interpolated pixels "a" to "s" are generated when filtering the reconstructed integer pixels "A" to "U" of the reference picture by an interpolation filter. The resolution of the reference picture is increased 4 times or more by using the interpolation as illustrated in the FIG. 11. At this time, the interpolation filter used is a variety of filters such as a bilinear filter, a DCT based interpolation filter, and a cubic interpolation filter.

Figure 12:
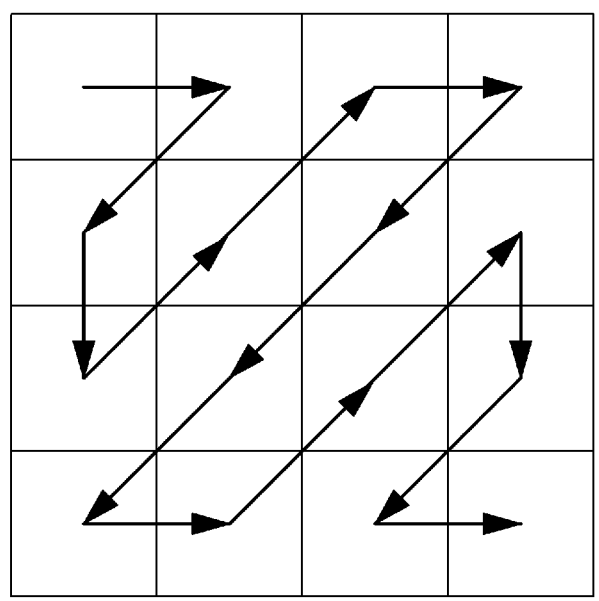
FIG. 12 is an exemplary diagram of a zigzag scanning of coefficients of a quantized transform block.

The entropy encoder 107 encodes the quantized transform blocks and output a bitstream. That is, the entropy encoder 107 scans the quantized transform coefficients of the respective quantized transform blocks outputted from the quantizer 105 by using a variety of scanning schemes such as a zigzag scan illustrated in FIG. 12, and encodes, by using a variety of encoding schemes such as an entropy encoding, transform coefficient stream obtained by the scanning. The entropy encoder 107 generates and outputs the bitstream including additional information (for example, information on the prediction mode, quantization parameter, motion parameter, and etc.) needed to decode the relevant block in the video decoding apparatus to be described below.

FIG. 13 is an exemplary diagram of truncated codes for encoding an index used in AMVP, merge and skip. It is advantageous to assign bits depending on the number of available neighboring blocks. Additionally, it is advantageous to only use the table for the maximum number like the first table in FIG. 13, regardless of the number of available neighboring blocks.

In at least one embodiment of the present disclosure, the entropy encoder 107 enocodes a current motion vector of a current block based on one or more representative blocks selected from the neighboring blocks of the current block according to the priorities set by the inter prediction scheme or mode performed on the current block, and encodes information on the predicted motion vector of the current motion vector determined as a motion vector that is the most similar to the current motion vector among the motion vectors of the selected representative blocks and the motion vector of the co-located block which is in the most similar position to the current block among blocks belonging to the reference picture. The entropy encoder 107 predictively encode the motion vector of the current block by using the determined predicted motion vector. Here, the inter prediction scheme means any one of the AMVP method, skip and merge. Further, the co-located block means the temporal candidate block described above. The entropy encoder 107 encodes the index indicating the predicted motion vector among the motion vectors of the selected representative blocks and the motion vector of the co-located block, and transmits the encoded index to the video decoding apparatus. Further, the entropy encoder 107 encodes the differential motion vector that is the difference between the current motion vector and the predicted motion vector, and transmits the encoded differential motion vector to the video decoding apparatus.

Hereinafter, according to a first embodiment to a third embodiment to be described below, the embodiments illustrate various methods for determining the representative blocks by selecting the representative blocks respectively from the left block group and the upper block group. Here, the left block group includes neighboring blocks located at left side of the current block and the upper block group includes neighboring blocks located at upper side of the current block. For reference, to determine representative vectors from candidate blocks means to determine the representative blocks from the candidate blocks according to a predetermined criterion and then to determine the predicted motion vector as one of the motion vectors of the determined representative blocks.

First Embodiment

Figure 14:
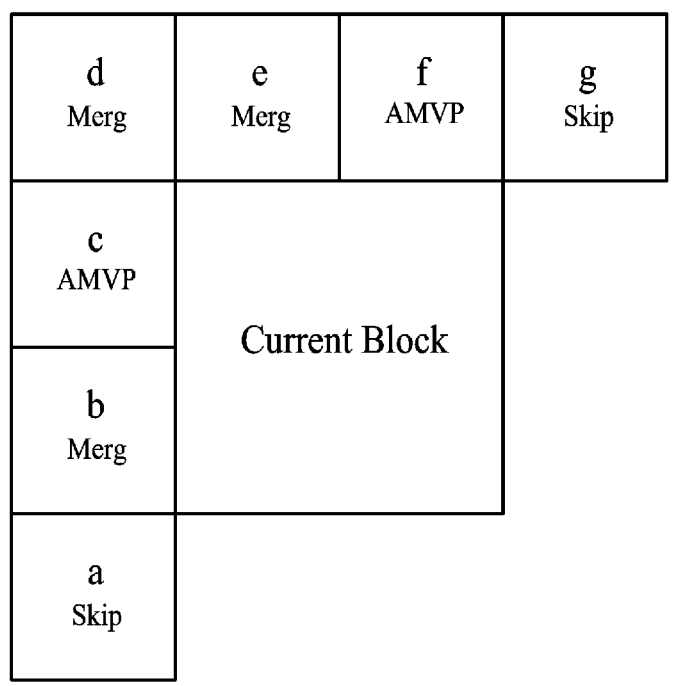
FIG. 14 is an exemplary diagram of inter prediction modes for neighboring blocks of a current block.

FIG. 14 is an exemplary diagram of inter prediction modes for neighboring blocks of a current block.

According to the present embodiment, the entropy encoder 107 elects each one of the representative blocks from two groups of candidate neighboring block, for example, a left block group (a, b and c) and an upper block group (d, e, f and g) in FIG. 14 when encoding information on the motion vector of the current block, selects the predict motion vector among total 3 representative vectors including the motion vectors of the two elected representative blocks and the motion vector (that is, temporal candidate vector) of the temporal candidate block, and assigns and encodes an index corresponding to the selected predicted motion vector. Further, the entropy encoder 107 encodes a differential motion vector 'mvd' that is a difference value between an original motion vector of the current block and the predicted motion vector.

In case that the priorities of the inter prediction modes are set as the order of 'AMVP>skip>merge' (i.e., among inter prediction modes of AMVP, skip and merge, AMVP has the highest priority, skip has the second highest priority, and merge has the lowest priority), a neighboring block encoded by the AMVP is priorly selected in the process of determining the representative vectors. Further, when there is no block using the AMVP, a neighboring block having a mode in the order of skip and then merge is selected. Accordingly, block c in the left block group and block f in the upper group are selected as representative blocks in FIG. 14. When there is a plurality of neighboring blocks whose inter prediction modes are same one another, the representative blocks are determined by the priorities of the block positions, for example, in the order of 'right>left' (i.e., the rightmost block has the highest priority, and priorities of blocks are gradually decreased from right to left) in case of the upper group and in the order of 'lower>upper' (i.e., the lowest block has the highest priority, and priorities of blocks are gradually decreased from bottom to top) in case of the left group. The priorities of the block positions are defined in the inverse direction. Further, the generation of the representative vectors is not limited by a scheme that one of the representative vectors is determined from the left block group and another is determined from the upper block group, but plural representative vectors are determined from one group. Further, the priority of the inter prediction mode is not limited to 'AMVP>skip>merge', but the priority for the AMVP, skip and merge scheme are determined by a variety of methods.

Meanwhile, in case of decoding process in the video decoding apparatus to be described, a process of determining the representative blocks is the same as that of determining the representative blocks in the video encoding process. Further, the current motion vector of the current block is reconstructed by extracting, from a bitstream, an index indicating the block finally selected from among the representative blocks and the temporal candidate block in the video decoding apparatus, determining the predicted motion vector to be the motion vector of the block corresponding to the extracted index, and adding the differential motion vector extracted from the bitstream to the determined predicted motion vector.

Second Embodiment

Figure 15:
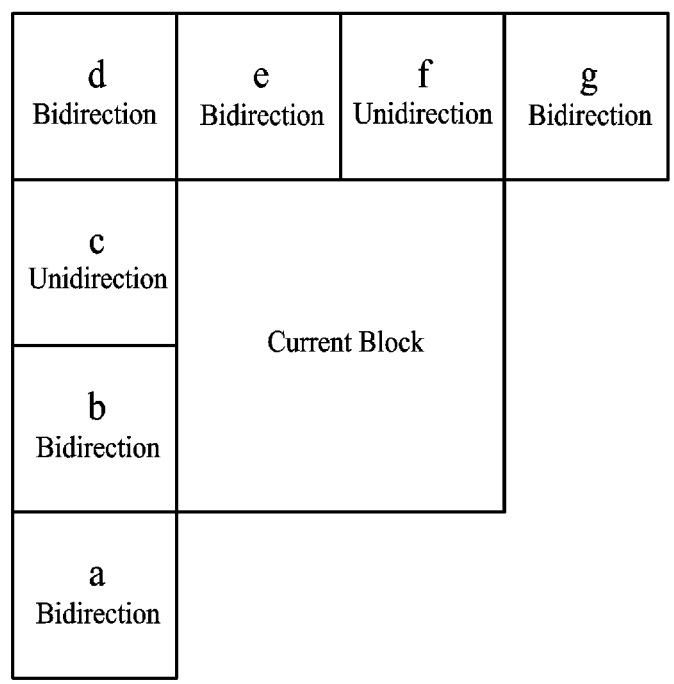
FIG. 15 is an exemplary diagram of inter prediction directions for neighboring blocks of a current block.

FIG. 15 is an exemplary diagram of inter prediction directions for neighboring blocks of a current block.

According to the second embodiment, the entropy encoder 107 selects the predicted motion vector among representative vectors of 3 blocks including two representative blocks selected respectively from two groups (left block group (a, b and c) and upper block group (d, e, f and g) in FIG. 14) and a temporal candidate block, and assigns and encodes an index corresponding to the predicted motion vector, like the first embodiment. Further, a differential motion vector 'mvd' is encoded, which is a difference value between an original motion vector of the current block and the selected predicted motion vector. These are same in a third embodiment to be described, too.

However, the second embodiment determines the representative blocks according to the priorities of the inter prediction directions of the neighboring blocks, which is the different from the first embodiment. When the priorities were set for example, in 'unidirection>bidirection' (i.e., a block of unidirection has a higher priority than blocks of bidirection) in the example of FIG. 15, it is identified whether the respective neighboring blocks of the current block were encoded unidirectionally or bidirectionally, and then, the motion vectors of the neighboring blocks encoded in the unidirection are priorly selected as the representative vectors. As in the first embodiment, the representative blocks are determined from each block of the left block group (a, b, c and d) and the upper block group (d, e, f and g), and two or more representative blocks are selected from each group or only one representative block is determined from all of the two groups. The priorities of the prediction direction are set to two or more directions among backward direction (list 0), forward direction (list 1) and bidirection.

When a priority is set to 'bidirection>unidirection', 'lower>upper' for block position in the left block group, and 'right>left' for block position in the upper block group, the block a and block g are determined as representative blocks in FIG. 15.

Further, one or more representative blocks are determined among the candidate blocks, based on the priorities of the inter prediction directions of the candidate blocks determined depending on the inter prediction direction of the current block. For example, when the inter prediction of the current block is in the backward direction, it is determined whether the inter prediction motion compensation direction of any one block (that is, a first candidate block) of the neighboring blocks is identical to that of the current block (that is, backward direction), and the first candidate block, is determined as a representative block when directions are identical to each other. If the inter prediction direction of the first candidate block is different from that of the current block, it is checked whether a picture order count POC of a reference picture of the current block is identical to that of a reference picture of the first candidate block, and the first candidate block is determined as a representative block when both POCs are identical to each other.

As such, when the first candidate block is not determined as a representative block after checking the first candidate block in consideration of the priorities of the inter prediction directions, it is checked whether another candidate block (that is, a second candidate block) can be selected as a representative block in the manner similar to the first candidate block.

Third Embodiment

Figure 16:
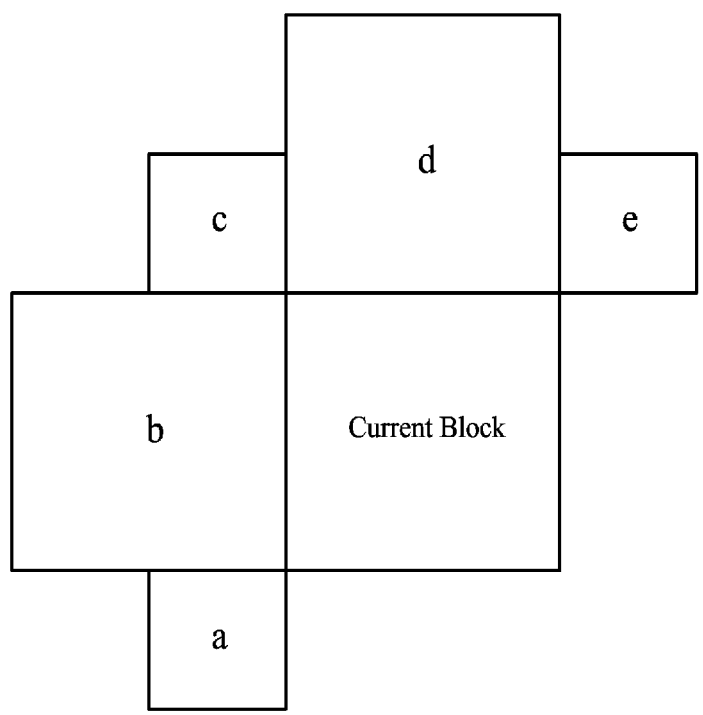
FIG. 16 is an exemplary diagram of the sizes of neighboring blocks of a current block.

FIG. 16 is an exemplary diagram illustrating block sizes of neighboring blocks of a current block.

The third embodiment is different from the first and second embodiments in that the entropy encoder 107 determines the representative blocks according to priorities of block sizes of the neighboring blocks. When priorities of the block sizes are set in the example of FIG. 16 (for example, set in 'large block>small block', i.e., the largest block in FIG. 16 has the highest priority, and the smaller a size of a block, the lower the priority of the block), the sizes of the neighboring blocks of the current block are compared with one another, and the largest block is priorly determined as a representative block.

If the priorities of 'large block>small block' are set in FIG. 16 and the priorities of block positions are set as in the order of 'lower>upper' and 'right>left' in the left block group and the upper block group respectively, block b and block d are determined as the representative blocks.

Further, the representative blocks can be determined according to the priorities of the sizes of the neighboring blocks compared to the size of the current block. For example, when the size of the current block is set as 16×16, a higher priority is set to a block close to the size of 16×16 among the neighboring blocks, and accordingly the representative blocks are determined among the neighboring blocks. Here, the motion vectors of the determined representative blocks become the representative motion vector (that is, representative vectors).

Fourth Embodiment

The fourth embodiment is different from the first, second and third embodiments in that the entropy encoder 107 determines one or more representative blocks among the neighboring blocks depending on priorities of distances from each neighboring block to a reference picture referenced by said each neighboring block.

According to the example of FIG. 16, when the neighboring blocks have different distances to reference pictures, respectively, the priorities are set according to the order of closer distances and the motion vector of the closest neighboring block is priorly set as a representative vector. For example, when the distance of the neighboring block c to its reference picture is 2, the distance of the neighboring block d to its reference picture is 1, and the distance of the neighboring block e to its reference picture is 3, the highest priority is set to the neighboring block d.

Further, a comparison can be made to the distance of a reference picture referenced by the current block. For example, when the distance from the current block to the reference picture referenced by the current block is 2, the highest priority is set to a neighboring block whose distance to a reference picture thereof is closest to 2, and its motion vector is set as a representative vector. Further, when determining the representative vectors, the priorities are determined according to the inter prediction directions and then the priorities of the distances of neighboring blocks to the their reference pictures are further considered. For example, in case that priorities of neighboring blocks are same depending on the inter prediction direction, the priorities are determined depending on whether the distance of the current block to its reference picture is identical to that of each neighboring block to its reference picture That is, the priorities are set higher in case of the same distance and lower in case of different directions with each other.

Now, a fifth embodiment to an eighth embodiment according to the present disclosure will be described.

In the fifth embodiment to the eighth embodiment, the entropy encoder 107 determines candidate blocks among the neighboring blocks to which the inter prediction was performed, according to a predetermined priority, determines representative blocks among the determined candidate blocks, according to a predetermined condition, and predictively encodes the motion vector (i.e. current motion vector) of the current block by determining the predicted motion vector from among the motion vectors of the determined representative blocks or the motion vector of the temporal candidate block.

Here, it is assumed that two candidate blocks are selected from the left block group and three candidate blocks are selected from the upper block group. Further, it is assumed that the priority of block selection in each group is in the order of 'lower>upper' in the left block group and is in the order of 'right>left' in the upper block group, if not mentioned otherwise.

Fifth Embodiment

According to the fifth embodiment, the entropy encoder 107 determines candidate blocks among the neighboring blocks to which the inter prediction was performed, according to priorities of the performed inter prediction method.

Figure 17:
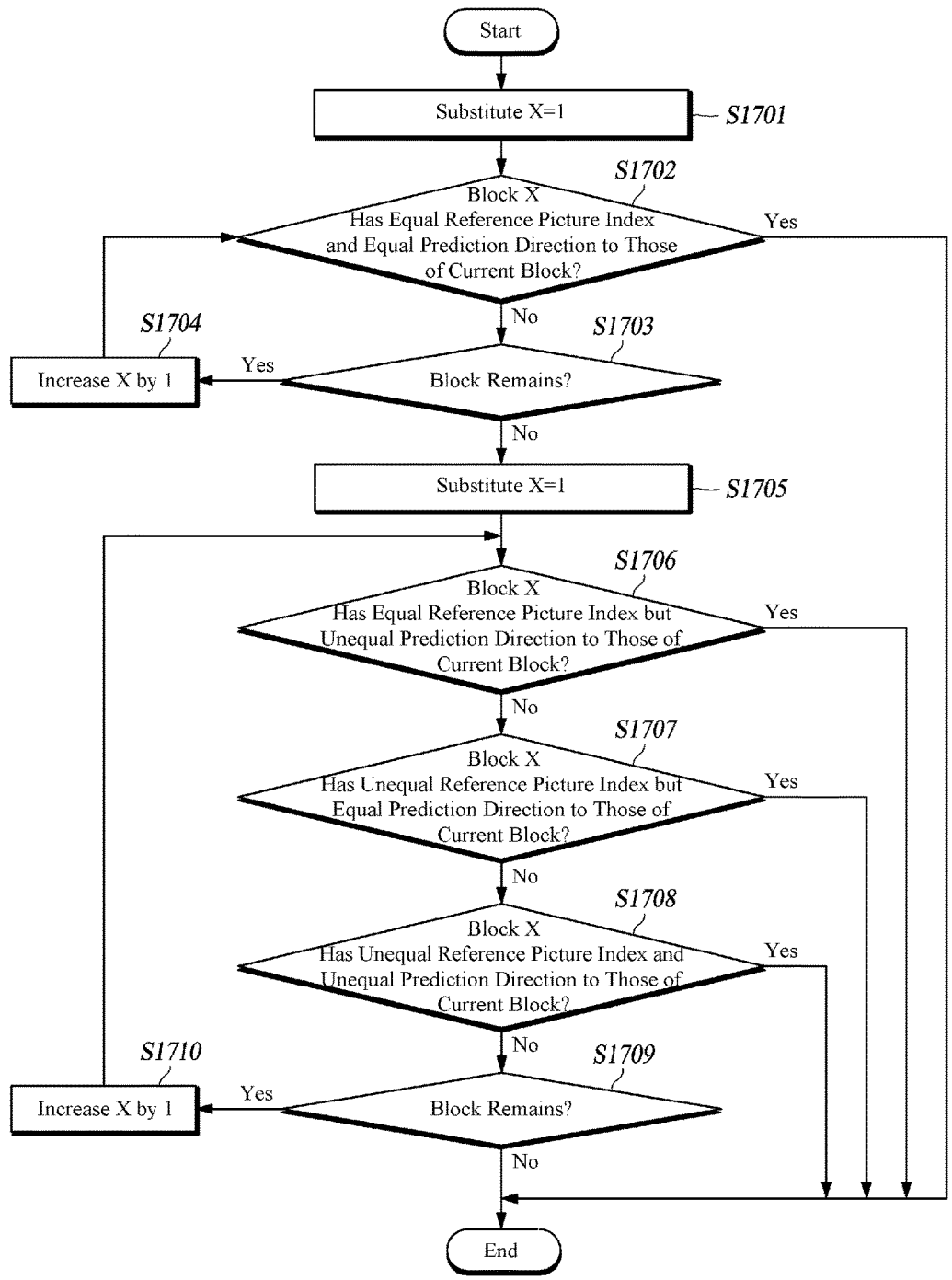
FIG. 17 is a flowchart of a method for obtaining a representative motion vector from motion vectors of candidate blocks.

While the representative vectors are directly determined in each group according to predetermined criteria in the first to fourth embodiments, according to the present embodiment, predetermined numbers of candidate blocks are determined in each group according to the inter prediction mode and the representative blocks are determined by using the algorithm in FIG. 17.

FIG. 18 is an exemplary diagram illustrating inter prediction modes and inter prediction directions of neighboring blocks of a current block.

According to FIG. 18, in case that the priority is set as the order of 'AMVP>skip>merge' for example, block "c" using AMVP and block "a" using skip are finally selected, from the left block group (a, b, c), as the candidate blocks to which the algorithm of FIG. 17 is applied. In the similar manner to the left block group, blocks g, d using AMVP and block e using skip are finally selected, from the upper group (d, e, f and g), as the candidate blocks to which the algorithm of FIG. 17 is applied. The number of candidate blocks set in each group is different depending on embodiments, and priorities based on the inter prediction methods are different too. Further, the priorities may be determined by mixing the inter prediction mode and the inter prediction direction.

After the candidate blocks are selected in each group, one or more representative vectors are determined by using the method of FIG. 17. Hereinafter, a process of determining at least one representative vector from the group A (for example, left block group) will be described with reference to FIG. 17. Here, the prediction direction is used as a kind of motion compensation direction (backward direction or forward direction). It is assumed that candidate blocks of the group A are A0 (block 1) and A1 (block 2), respectively. At this time, A0 becomes a block 1 in FIG. 17 and A1 becomes a block 2 First, the process starts with X=1 (S1701). It is determined whether block X has equal reference picture index and equal prediction direction to those of the current block (S1702). When the result of step S1702 is 'Yes', block X becomes a representative block (that is, a motion vector of the block becomes a representative block.). When the result of step S1702 is 'No', it is determined whether there is the remaining the block (S1703). When the result of step S1703 is 'Yes', X is increased by 1 (that is, becomes block 2) and the process returns to step S1702, again (S1704).

If the result of step S1703 is 'No', X is substituted with 1 (S1705) and it is checked whether block X has equal reference picture index but unequal prediction direction to those of the current block (S1706). If the result of step S1706 is 'Yes', block X becomes a representative block. If the result of step S1706 is 'No', it is checked whether block X has unequal reference picture but equal prediction direction to those of the current block (S1707). If the result of step S1707 is 'Yes', block X becomes a representative block. If the result of step S1707 is 'No', it is checked whether block X has unequal reference picture index and unequal prediction direction to those of the current block (S1708). If the result of step S1708 is 'Yes', block X becomes a representative block. If the result of step S1708 is 'No', it is determined whether there is the remaining block. If it is determined that the block remains, X is increased by 1 (that is, becomes block 2) and the process returns to step S1706, again (S1710).

Here, if it is determined that both blocks 1 and 2 are 'No' in the step S1708, it means that the block is not available in the inter prediction. For example, it is the case that the block is the intra predicted block.

At least one representative vector is also extracted from the group B (for example, upper block group) by using the same method as described above.

Sixth Embodiment

According to the sixth embodiment, the entropy encoder 107 selects candidate blocks among neighboring blocks to which the inter prediction has been performed according to the priorities in the direction of the performed inter prediction.

When the priority is set as the order of 'unidirection>bidirection', the unidirectional blocks among the neighboring blocks are priorly set as candidate blocks, and then representative blocks are determined by using the algorithm in FIG. 17. Further, it is possible that the priority is determined for two or more among backward direction (list 0), forward direction (list 1) and bidirection and then candidate blocks are determined.

Accordingly, in FIG. 18, when priority is set as the order of 'unidirection>bidirection', blocks c and a are selected as candidate blocks in the left block group, and blocks f, d and g are selected as candidate blocks in the upper block group. According to the algorithm in FIG. 17, A representative block is determined respectively from among the candidate blocks in the left block group and from among the candidate blocks in the upper block group.

Further, a comparison can be made to the inter prediction direction of the current block. For example, when the inter prediction of the current block progresses in the backward direction, the block whose inter prediction progresses in the backward direction is set to a higher priority to determine the candidate blocks, and then is determined as the representative vectors by using the algorithm in FIG. 17.

Seventh Embodiment

According to the seventh embodiment, the entropy encoder 107 selects candidate blocks among neighboring blocks to which the inter prediction has been performed according to priorities of block sizes of the performed inter prediction.

For example, when the priority is set as the order of 'large block>small block', the largest block is priorly selected as a candidate block. After the candidate blocks are selected, one or more representative blocks are determined by using the algorithm in FIG. 17.

Accordingly, in the case of FIG. 16, when the priority is set to the order of 'large block>small block', blocks b and a are selected, as the candidate blocks, from the left block group and blocks d, e and c are selected as the candidate block from the upper block group. Here, at least one representative block is determined respectively from the candidate blocks in the left block group and from the candidate blocks in the upper block group.

Further, a comparison can be made to the size of the current block. For example, when the size of the current block is set 16×16, higher priorities are set to blocks whose size are close to 16×16 among the neighboring blocks, so that the blocks are set as the candidate blocks and then a representative block is determined among the candidate blocks by using the algorithm in FIG. 17.

Eighth Embodiment

According to the eighth embodiment, the entropy encoder 107 selects candidate blocks among neighboring blocks to which the inter prediction has been performed according to priorities of the distances of each neighboring block to its reference picture.

When the priorities are set as the order of 'short distance>long distance', the priorities are set in the order that the distance of each neighboring block to its reference picture is short, and the neighboring block which has the shortest distance to the reference picture is priorly set as a candidate block. For example, when the distances between the neighboring blocks c, d and e and their reference pictures are 2, 1 and 3, respectively, the highest priority is set to block d. And then, one or more representative vectors are determined by applying the algorithm in FIG. 17 to the candidate blocks.

Further, a comparison can be made to the distance of the current block to its reference picture. For example, when the distance to the picture referred in the motion estimation of the current block is 2, a higher priority is set to a neighboring block whose distance to the reference picture thereof is close to 2, so as to select candidate blocks, and then one or more representative vectors are determined by applying the algorithm in FIG. 17 to the selected candidate blocks.

Meanwhile, in applying the representative block determination algorithm in FIG. 17, it is determined whether candidate blocks meet a predetermined condition according to priority based on any one of inter prediction method, inter prediction direction, block size and distance to a reference picture with respect to the candidate block, and then representative blocks are determined from the candidate blocks which meet the predetermined condition. For example, when a priority is set in 'unidirection>bidirection', the unidirection block is priorly set a block 1 and the bidirection is set a block 2, and then the algorithm in FIG. 17 is applied. When there are two unidirection blocks, the lower block becomes a block 1 and the upper block becomes a block 2 according to a block position priority (for example, in case of 'lower>upper'), and then the algorithm in FIG. 17 is applied.

Figure 19:
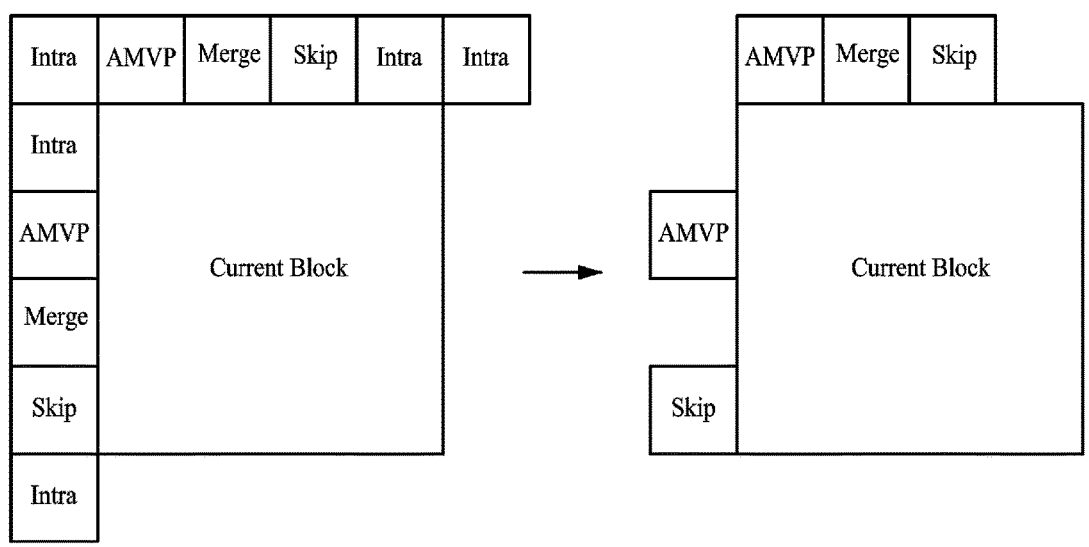
FIG. 19 is another exemplary diagram of neighboring blocks.

Meanwhile, FIG. 19 is another exemplary diagram of neighboring blocks. When selecting candidate blocks in the fifth embodiment, candidate blocks are found in the order of AMVP, skip and merge among the inter-predicted neighboring blocks in each group. the example illustrates that two candidate blocks are selected from the left block group and three candidate blocks are selected from the upper block group.

Figure 20:
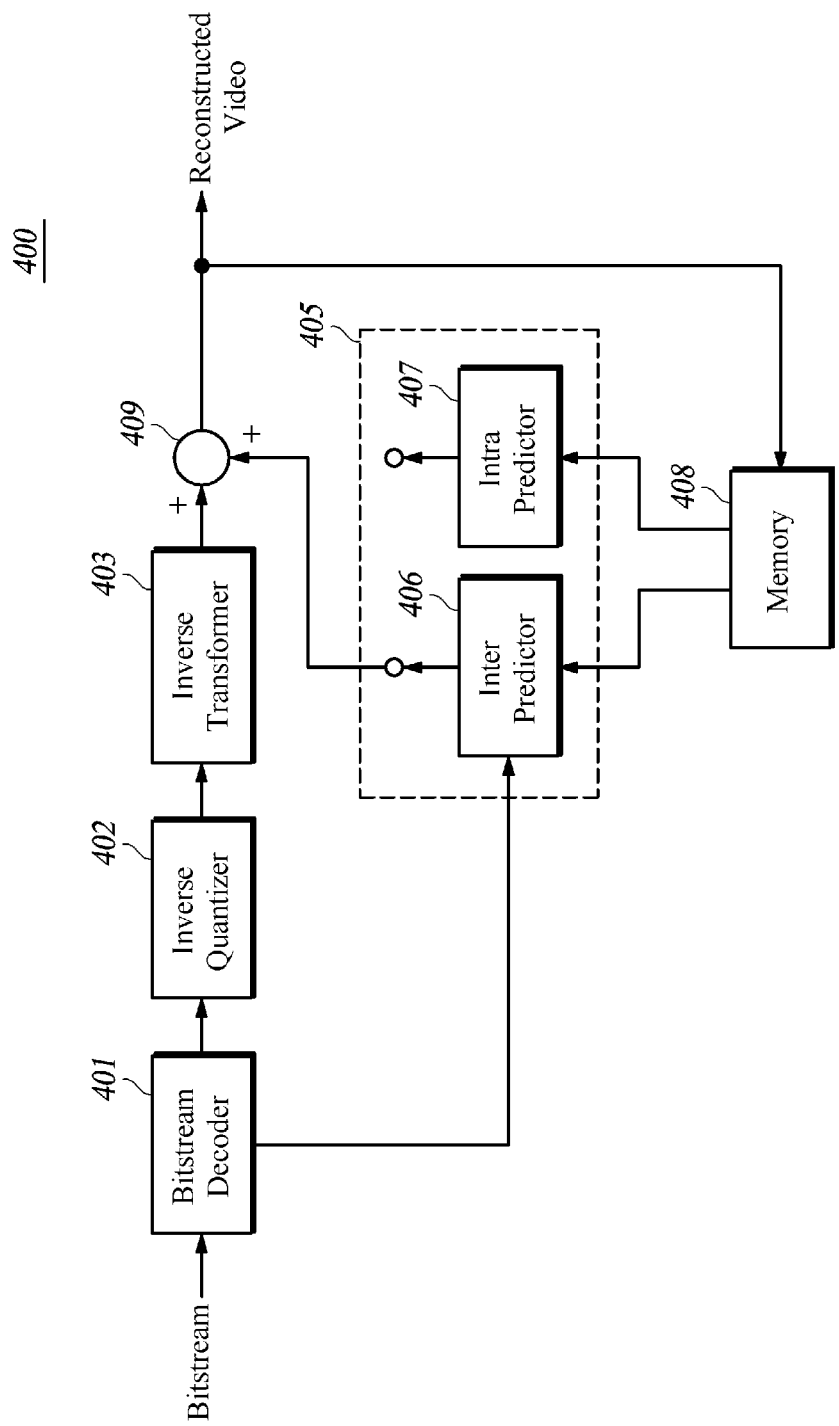
FIG. 20 is a schematic block diagram of a video decoding apparatus according to at least one embodiment of the present disclosure.

FIG. 20 is a schematic block diagram of a video decoding apparatus according to at least one embodiment of the present disclosure.

Like the video encoding apparatus, the video decoding apparatus 400 is a PC (Personal Computer), a notebook computer, a TV set, a PDA (Personal Digital Assistant), a PMP (Portable Multimedia Player), a PSP (PlayStation Portable), a wireless terminal, a digital TV, and the like. The video decoding apparatus corresponds to various apparatuses each including (a) a communication apparatus such as a communication modem and the like for performing communication with various types of devices or wired/wireless communication networks, (b) a memory for storing various programs and data that encode a video, and (c) a microprocessor to execute a program so as to perform calculations and controlling, and the likes.

The video decoding apparatus 400 is comprised of a bitstream decoder 401, an inverse quantizer 402, an inverse transformer 403, a predictor 405, an adder 409, and a memory 408. All or some components of the video decoding apparatus 400, such as the bitstream decoder 401, the inverse quantizer 402, the inverse transformer 403, the predictor 405, and the adder 409 are implemented by one or more processors and/or application-specific integrated circuits (ASICs).

The bitstream decoder 401 decodes a bitstream and extracts quantized transform blocks. That is, the bitstream decoder 401 decodes and inversely scans quantized transform coefficients extracted from the bitstream to thereby reconstruct the quantized transform blocks. At this time, the bitstream decoder 401 performs the decoding by using a decoding scheme such as an entropy decoding used in the entropy decoder 107.

Further, in case of the inter prediction, the bitstream decoder 401 reconstructs a differential motion vector by extracting the encoded differential motion vector from the bitstream and decoding it, and extracts an AMVP index for the predicted motion vector used in the AMVP from the bitstream. Here, the motion vector of the representative block identified from the extracted AMVP index is reconstructed as the predicted motion vector, and a motion vector (current motion vector) of the current block is reconstructed by summing the reconstructed predicted motion vector and the decoded differential motion vector.

Meanwhile, a process to determine representative blocks in order to decode a motion vector at the bitstream decoder 401 of the video decoding apparatus 400 is identical to the representative block determination process performed in the entropy encoder 107 of the video encoding apparatus 100. Accordingly, the bitstream decoder 401 selects the representative blocks according to priority based on at least one selected from among inter prediction method, inter prediction direction, block size and distance of neighboring blocks to their reference pictures. That is, the bitstream decoder 401 determines one or more representative blocks from neighboring blocks of the current block, according to priorities of the neighboring blocks.

Further, in case of the intra prediction, the bitstream decoder 401 extracts the decoded intra prediction mode index from the bitstream and decodes it, thereby indicating which intra prediction mode the current block has used.

The inverse quantizer 402 inversely quantizes the quantized transform blocks to thereby transform blocks. That is, the inverse quantizer 402 inversely quantizes the quantized transform coefficients of each quantized transform block outputted from the bitstream decoder 401. At this time, the inverse quantizer 402 inversely performs the quantization scheme used in the quantizer 105 of the video encoding apparatus.

The inverse transformer 403 reconstructs a residual block of the current coding unit to be decoded, by inversely transforming the transform blocks from a frequency domain into a spatial domain. That is, the inverse transformer 403 inversely transforms the quantized transform coefficients of the respective transform blocks outputted from the inverse quantizer 402, to thereby reconstruct the residual block having residual signals. The inverse transform is performed by inversely performing the transform scheme used in the transformer 104 of the video encoding apparatus.

The predictor 405 includes an intra predictor 406 and an inter predictor 407, which have similar functions of the intra predictor 102 and the inter predictor 103 of the video encoding apparatus described in FIG. 3, respectively. The predictor 405 generates a predicted block of each current block by the intra prediction or inter prediction. Herein, the current block means a prediction unit partitioned from the current coding unit.

An adder 409 adds the reconstructed residual signals to a predicted block of each current block to reconstruct the current coding unit.

A memory 408 stores the reconstructed current coding unit and uses it to make a prediction afterward, in the same manner as the memory of the video encoding apparatus.

In the video decoding apparatus, a process of determining the representative blocks is the same as that in the video encoding apparatus, and the bitstream decoder 401 reconstructs the current motion vector by adding the predicted motion vector, which is indicated by the index extracted from the bitstream, and the differential motion vector decoded from the bitstream.

The inter predictor 406 predicts the current block by using the current motion vector.

Meanwhile, the video encoding/decoding apparatuses according to at least one embodiment of the present disclosure are embodied by connecting the bitstream (encoding data) output port of the video encoding apparatus in FIG. 3 to the bitstream input port of the video decoding apparatus in FIG. 20.

The video encoding/decoding apparatus according to at least one embodiment of the present disclosure includes a video encoding apparatus 100 (embodying a video encoder in the video encoding/decoding apparatus according to at least one embodiment of the present disclosure) and a video decoding apparatus 400 (embodying a video encoder in the video encoding/decoding apparatus according to at least one embodiment of the present disclosure). The video encoding apparatus 100 is configured to determine one or more representative blocks from predetermined neighboring blocks of a current block according to a priority based on any one of an inter prediction method, an inter prediction direction, a block size and the distance of the neighboring blocks to their reference pictures. Alternatively, The video encoding apparatus 100 determines candidate blocks from predetermined neighboring blocks of a current block according to a priority of any one of an inter prediction method, an inter prediction direction, a motion compensation direction, a block size and the distance of each neighboring block to its reference picture and then determine one or more representative block from the determined candidate blocks according to one or more predetermined conditions. The video encoding apparatus 100 is configured to encode, into a bitstream, a motion vector of the current vector by using the motion vector selected from the group comprising motion vectors of the determined representative blocks and/or a motion vector of at least one temporal candidate block placed in position similar to the current block within a reference picture (that is, temporal candidate motion vector). The video decoding apparatus 400 is configured to extract, from a bitstream, a differential motion vector and an index (AMVP index) indicating a predicted motion vector, determine one or more representative blocks from the neighboring blocks encoded by using an inter prediction according to a priority based on at least one among an inter prediction method, an inter prediction direction, a block size and the distance of each neighboring blocks to its reference pictures, determine an predicted motion vector of the current block as a motion vector of a representative block identified by the extracted index, and reconstruct the current block by using the determined predicted motion vector.

The video encoding method according to at least one embodiment of the present disclosure comprises: partitioning an input image into coding units, and a current coding unit to be encoded into one or more prediction units (current blocks), generating a predicted block of each current block partitioned from the current coding unit by using pixel values within the current picture which has already been encoded and then decoded and are adjacent to the current block or by using information on reference pictures at, generating a residual block of the current coding unit by subtracting predicted blocks from the current blocks, generating one or more transform blocks by transforming the residual block, generating quantized transform blocks by quantizing the transform blocks, entropy-encoding the quantized transform blocks into a bitstream, reconstructing transform blocks having transform coefficients by inverse-quantizing the quantized transform blocks, reconstructing a residual block of the current coding unit having residual signals by inverse-transforming the reconstructed transform blocks, reconstructing the current coding unit by adding the reconstructed residual block to the predicted blocks In the video encoding method according to at least one embodiment of the present disclosure, a first embodiment of the entropy-encoding step includes determining one or more representative blocks from neighboring blocks of a current block, the neighboring blocks being encoded by an inter prediction, according to priorities based on the inter prediction method and predictively encoding a motion vector of the current block by using, as a predicted motion vector, a motion vector selected from motion vectors of the determined representative blocks and a temporal candidate motion vector. Here, the method for determining the representative blocks according to a priority of the inter prediction method means setting a priority with respect to prediction methods including a motion estimation (AMVP), a skip method and a merge method, and selecting the preset number of representative blocks among the neighboring blocks, in the order from a neighboring block of higher priority to a neighboring block of lower priority.

In the video encoding method according to at least one embodiment of the present disclosure, a second embodiment of the entropy-encoding step includes determining one or more representative blocks from neighboring blocks of a current block, the neighboring blocks being encoded by an inter prediction, according to priorities of the inter prediction direction and predictively encoding a motion vector of the current block by using, as a predicted motion vector, a motion vector selected from motion vectors of the determined representative blocks and a temporal candidate motion vector. Here, the method for determining the representative blocks according to a priority of the inter prediction direction means setting a priority with respect to uni-directional and bidirectional predictions, and selecting the preset number of representative blocks among the neighboring blocks, in the order from a neighboring block of higher priority to a neighboring block of low priority. Further, the method for determining the representative blocks according to a priority of the inter prediction direction means setting a priority with respect to two or more prediction directions of a backward direction prediction, a forward direction prediction and a bidirection prediction, and selecting the preset number representative blocks among the neighboring blocks, in the order from a neighboring block of higher priority to a neighboring block of lower priority.

In the video encoding method according to at least one embodiment of the present disclosure, a third embodiment of the entropy encoding step includes determining one or more representative blocks from neighboring blocks of a current block, the neighboring blocks being encoded by using an inter prediction, according to a priority of the block size and predictively encoding a motion vector of the current block by using, as a predicted motion vector, a motion vector selected from motion vectors of the determined representative blocks and a temporal candidate motion vector. Here, the method for determining the representative blocks according to a priority of the block size means setting a priority with respect to a small block and a large block, and selecting the preset number of representative blocks among the neighboring blocks in the order from a neighboring block of higher priority to a neighboring block of lower priority.

In the video encoding method according to at least one embodiment of the present disclosure, a fourth embodiment of the entropy encoding step includes selecting candidate blocks from neighboring blocks of a current block, the neighboring blocks being encoded by an inter prediction, according to priority of the inter prediction method, determining one or more representative blocks among the selected candidate blocks according to a predetermined condition, and predictively encoding a motion vector of the current block by using, as a predicted motion vector, a motion vector selected from motion vectors of the determined representative blocks and a temporal candidate motion vector. Here, the method for selecting candidate blocks according to a priority of the inter prediction method means setting a priority with respect to prediction methods including a motion estimation (AMVP), a skip method and a merge method, and selecting the preset number of candidate blocks among the neighboring blocks in the order from a neighboring block of higher priority to a neighboring block of lower priority.

In the video encoding method according to at least one embodiment of the present disclosure, a fifth embodiment of the entropy encoding step includes selecting candidate blocks from neighboring blocks of a current block, the neighboring blocks being encoded by using an inter prediction, according to priority of the inter prediction direction, determining one or more representative blocks among the selected candidate blocks according to a predetermined condition, and predictively encoding a motion vector of the current block by using, as a predicted motion vector, a motion vector selected from motion vectors of the determined representative blocks and a temporal candidate motion vector. Here, the method for determining the representative block according to a priority of the inter prediction direction means setting a priority with respect to unidirectional and bidirectional predictions and selecting the preset number of candidate blocks among the neighboring blocks in the order from a neighboring block of higher priority to a neighboring block of lower priority, or setting a priority with respect to two or more prediction directions among a backward direction prediction, a forward direction prediction and bidirection prediction and selecting the preset number of candidate blocks among the neighboring blocks in the order from a neighboring block of higher priority to a neighboring block of lower priority.

In the video encoding method according to at least one embodiment of the present disclosure, a sixth embodiment of the entropy encoding step includes selecting candidate blocks from neighboring blocks of a current block, the neighboring blocks being encoded by using an inter prediction, according to priority of block size, determining one or more representative blocks among the selected candidate blocks according to a predetermined condition, and predictively encoding a motion vector of the current block by using, as a predicted motion vector, a motion vector selected from motion vectors of the determined representative blocks and a temporal candidate motion vector. Here, the method for selecting candidate blocks according to a priority of the block size means setting a priority with respect to a small block and a large block and selecting the preset number of candidate blocks among neighboring blocks in the order from a neighboring block of higher priority to a neighboring block of lower priority.

The video encoding/decoding method according to at least one embodiment of the present disclosure is embodied by coupling the video encoding method according to at least one embodiment of the present disclosure and the video decoding method according to at least one embodiment of the present disclosure.

The video encoding/decoding method according to at least one embodiment of the present disclosure includes a video encoding step and a video decoding step. The video encoding step comprises determining one or more representative blocks of neighboring blocks in which an inter prediction was performed, according to a priority based on any one of an inter prediction method, an inter prediction direction, a motion compensation direction, a block size and the distance of each neighboring block to its reference picture. Alternatively, The video encoding step comprises determining candidate blocks among neighboring blocks in which an inter prediction was performed, according to a priority based on any one of an inter prediction method, an inter prediction direction, a motion compensation direction, a block size and the distance of each neighboring block to its reference picture and then determining one or more representative blocks among the determined candidate blocks according to predetermined conditions, and predictively encoding a motion vector of the current vector by using, as a predicted motion vector, a motion vector selected from the group comprising motion vectors of the determined representative blocks and/or at least one temporal candidate motion vector. The video decoding step comprises extracting a differential motion vector and an index (AMVP index) indicating a predicted motion vector from a bitstream, determining one or more representative blocks from the neighboring blocks encoded by using an inter prediction, according to a priority based on at least one of an inter prediction method, an inter prediction direction, a block size and the distance of each neighboring block to its reference picture, determining a predicted motion vector of the current block as a motion vector of a representative vector identified by the extracted index, and reconstructing the current block by using the determined predicted motion vector.

According to various embodiments of the present disclosure as described above, the current motion vector of the current block is predicted more accurately by using motion vectors of various neighboring blocks, thereby attaining an increased improvability of the coding efficiency. That is, the present disclosure provides enhancing a coding efficiency by predicting a motion vector of a current block based on motion vectors of neighboring blocks of the current block.

Some embodiments as described above are implemented in the form of one or more program commands that are read and executed by a variety of computer systems and be recorded in any non-transitory, computer-readable recording medium. The computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

What is claimed is:

1. A video encoding apparatus, comprising:
a predictor configured to generate a predicted block of a current block corresponding to a predicted motion vector and a differential motion vector; and
an entrophy encoder configured to encode an index for use in identifying the predicted motion vector of the current block and the differential motion vector in a bitstream,
wherein the predicted motion vector of the current block corresponds to a motion vector identified by the index in an inter prediction mode, and
wherein the index corresponds to at least one of representative blocks determined using neighboring blocks of the current block, in consideration of priorities of block positions,
wherein the at least one of representative blocks is determined in consideration of a difference between a first picture order count (POC) corresponding to a first reference picture of a neighboring block and a second picture order count (POC) corresponding to a second reference picture of the current block, when a first inter prediction direction corresponding to the neighboring block and a second inter prediction direction corresponding to the current block are identical.

2. The video encoding apparatus of claim 1, wherein the representative blocks include a first representative block corresponding to a left block group and a second representative block corresponding to an upper block group.

3. The video encoding apparatus of claim 1, wherein the at least one representative blocks is determined by comparing a picture order count corresponding to a reference picture of a neighboring block and a picture order count corresponding to a reference picture of the current block.

4. The video encoding apparatus of claim 1, wherein the representative blocks are determined from a left block group and an upper block group, wherein the left block group includes two blocks located at a left side of the current block, and the upper block group includes three blocks located at an upper side of the current block and the priorities of block positions are in an order of 'lower>upper' for the left block group and in an order of 'right>left' for the upper block group.

5. The video encoding apparatus of claim 1, wherein the representative blocks include a temporal candidate block which is temporally adjacent to the current block.

* * * * *